(12) United States Patent
Koga et al.

(10) Patent No.: US 11,721,013 B2
(45) Date of Patent: Aug. 8, 2023

(54) INFORMATION PROCESSING APPARATUS, DETERMINATION METHOD, IMPRINT APPARATUS, LITHOGRAPHY SYSTEM, ARTICLE MANUFACTURING METHOD, AND NON-TRANSITORY COMPUTER-READABLE STORAGE MEDIUM

(71) Applicant: CANON KABUSHIKI KAISHA, Tokyo (JP)

(72) Inventors: Shinichiro Koga, Utsunomiya (JP); Mitsuhiro Masuda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 394 days.

(21) Appl. No.: 17/023,867

(22) Filed: Sep. 17, 2020

(65) Prior Publication Data
US 2021/0097675 A1 Apr. 1, 2021

(30) Foreign Application Priority Data
Sep. 30, 2019 (JP) ................ 2019-180717

(51) Int. Cl.
*G06T 7/00* (2017.01)
*G06N 20/00* (2019.01)
(Continued)

(52) U.S. Cl.
CPC ....... *G06T 7/0008* (2013.01); *G01N 21/8806* (2013.01); *G06N 3/08* (2013.01);
(Continued)

(58) Field of Classification Search
CPC .......... G01N 21/9501; G01N 21/9505; G01N 21/8806; G01N 2021/8825; G03F 7/705;
(Continued)

(56) References Cited

U.S. PATENT DOCUMENTS

| | | | |
|---|---|---|---|
| 9,194,817 B2 | 11/2015 | Sugihara | |
| 10,395,362 B2* | 8/2019 | Gupta | ................... G06N 20/00 |
| 10,416,551 B2 | 9/2019 | Aihara | |
| 10,657,638 B2* | 5/2020 | Milligan | ............... G06N 3/0409 |
| 10,996,574 B2* | 5/2021 | Takiguchi | ............. G03F 9/7092 |

(Continued)

FOREIGN PATENT DOCUMENTS

| | | |
|---|---|---|
| JP | 2014041081 A | 3/2014 |
| JP | 2016148747 A | 8/2016 |

(Continued)

*Primary Examiner* — Hoa Q Pham
(74) *Attorney, Agent, or Firm* — Rossi, Kimms & McDowell LLP

(57) ABSTRACT

The present invention provides an information processing apparatus for determining, for a substrate having undergone an imprint process that forms a pattern of an imprint material, presence/absence of a formation defect of the pattern, including a generating unit configured to generate learning models in one-to-one correspondence with a plurality of different illumination conditions by using images obtained by capturing images of a plurality of substrates on which the pattern is formed under the plurality of illumination conditions, and an obtaining unit configured to input the images obtained by capturing images of the substrates having undergone the imprint process and containing the pattern, to a plurality of learning models generated by the generating unit, and obtain a temporary determination result temporarily indicating the presence/absence of a formation defect of the pattern from each of the plurality of learning models.

18 Claims, 11 Drawing Sheets

(51) Int. Cl.
*G01N 21/88* (2006.01)
*G06N 3/08* (2023.01)

(52) U.S. Cl.
CPC ..... *G06N 20/00* (2019.01); *G01N 2021/8825* (2013.01); *G06T 2207/30148* (2013.01)

(58) Field of Classification Search
CPC .. G03F 7/0002; G03F 7/7035; G03F 7/70483; G03F 7/70616; G03F 7/70625; G03F 7/70633; G03F 7/7038; G06T 7/0008; G06T 2207/30148; G06N 20/00; G06N 3/08; G05B 13/0265
USPC ............ 356/237.1–237.5; 264/408; 425/150, 425/174.4; 355/52, 78
See application file for complete search history.

(56) References Cited

U.S. PATENT DOCUMENTS

| | | | |
|---|---|---|---|
| 11,061,335 B2* | 7/2021 | Koga | G03F 7/70525 |
| 11,257,207 B2* | 2/2022 | Fang | G06T 7/001 |
| 11,521,312 B2* | 12/2022 | Uchida | G06T 7/11 |
| 2020/0004158 A1* | 1/2020 | Koga | G03F 7/70625 |
| 2022/0019180 A1* | 1/2022 | Samejima | G05B 13/0265 |
| 2022/0309647 A1* | 9/2022 | Kizu | G03F 9/7042 |

FOREIGN PATENT DOCUMENTS

| | | |
|---|---|---|
| JP | 2019080047 A | 5/2019 |
| JP | 2019090884 A | 6/2019 |
| JP | 2019102495 A | 6/2019 |
| WO | 2016092697 A1 | 6/2016 |

* cited by examiner

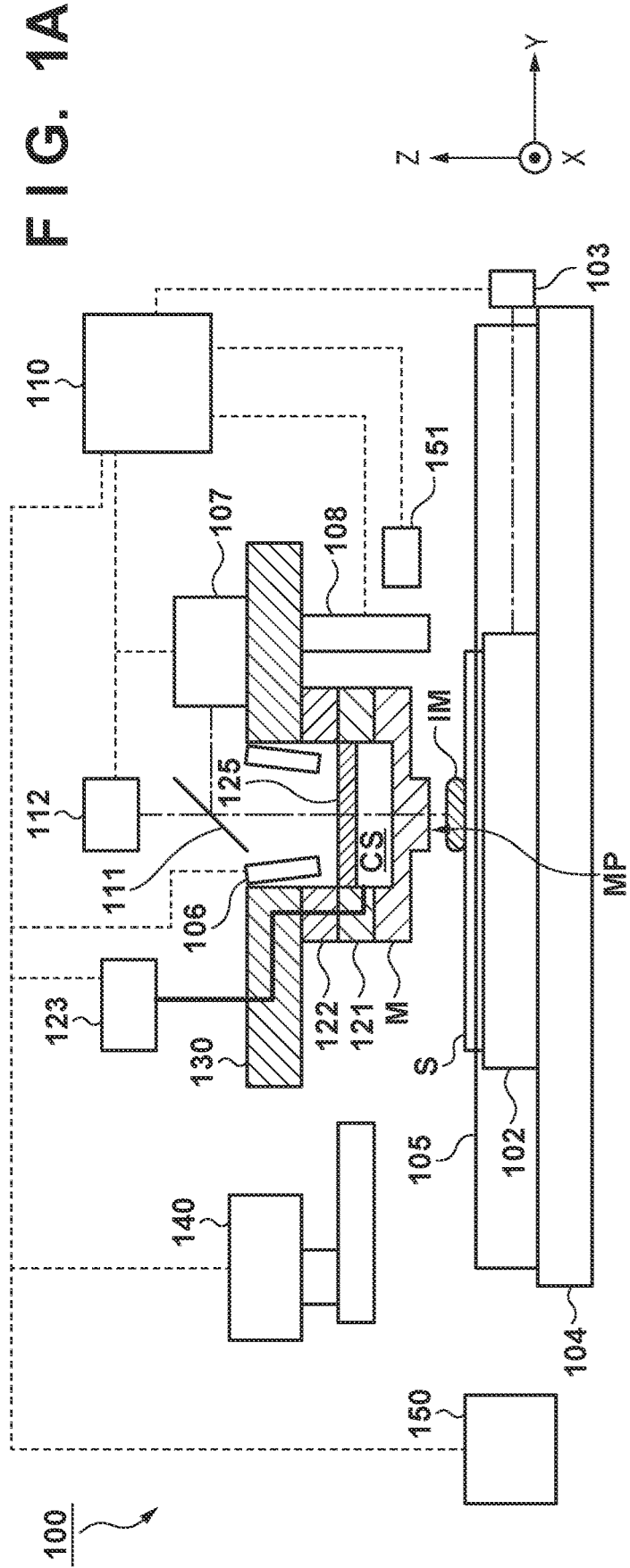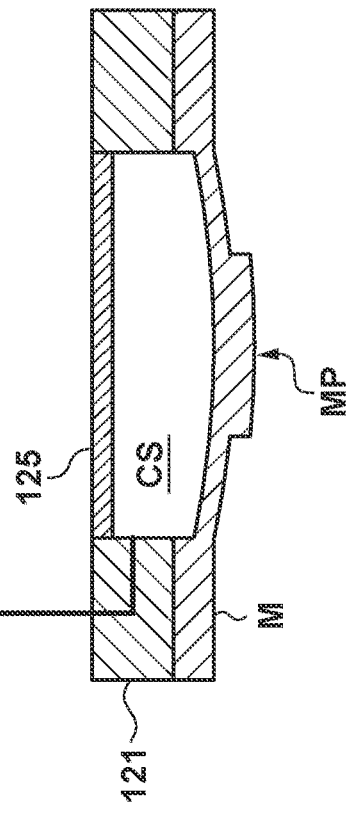

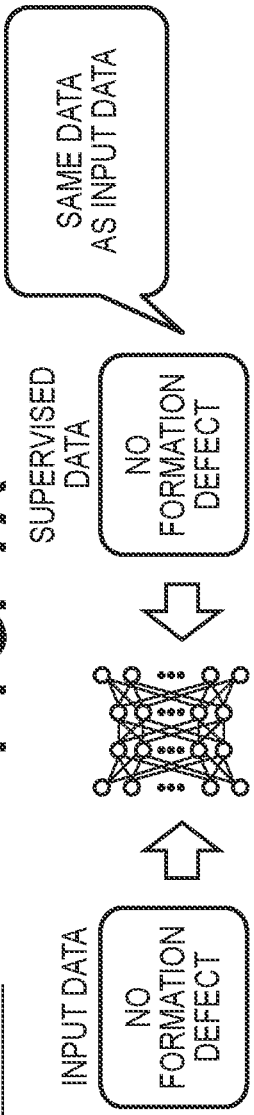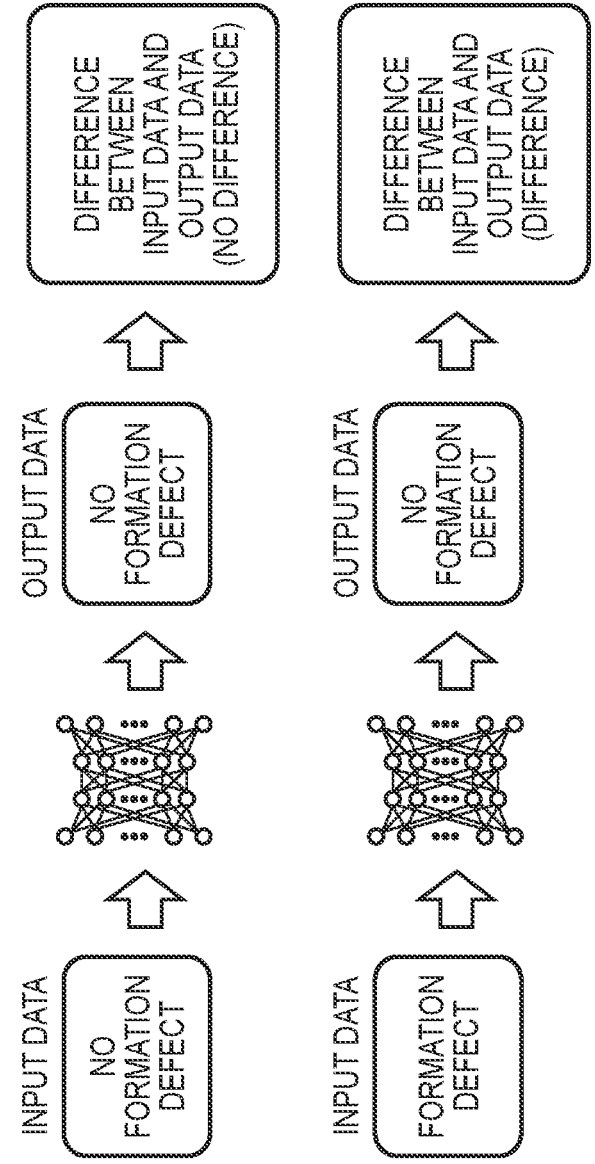

FIG. 8
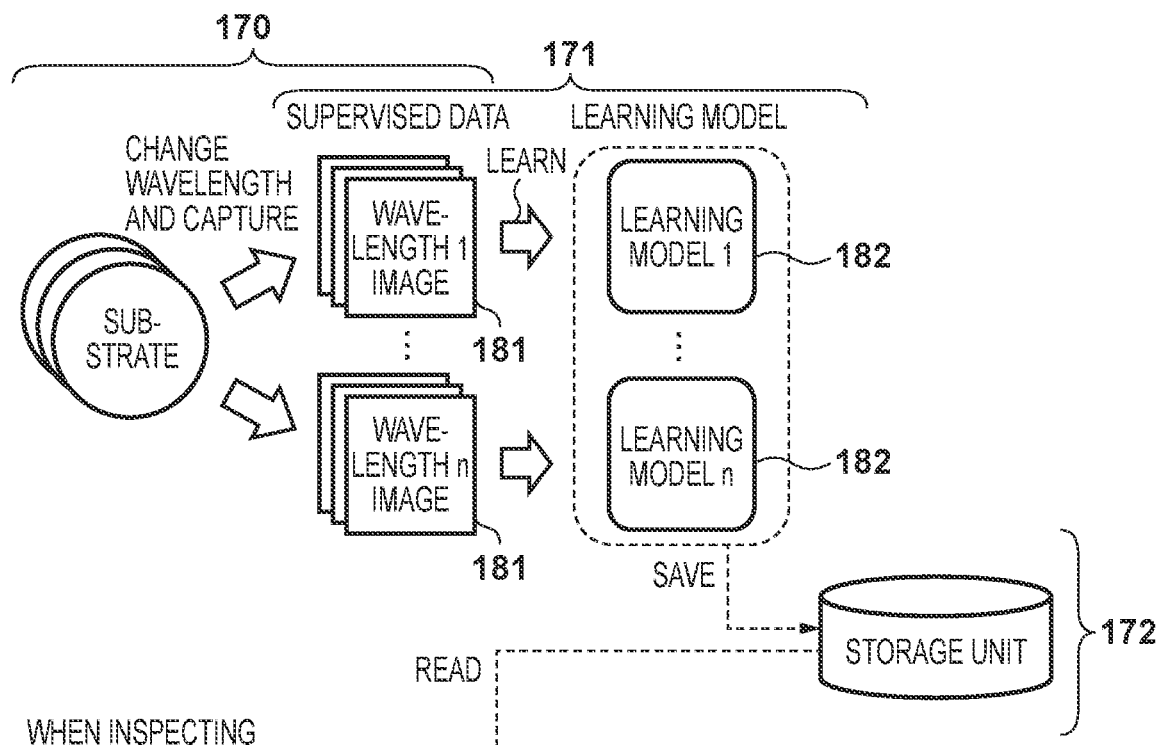
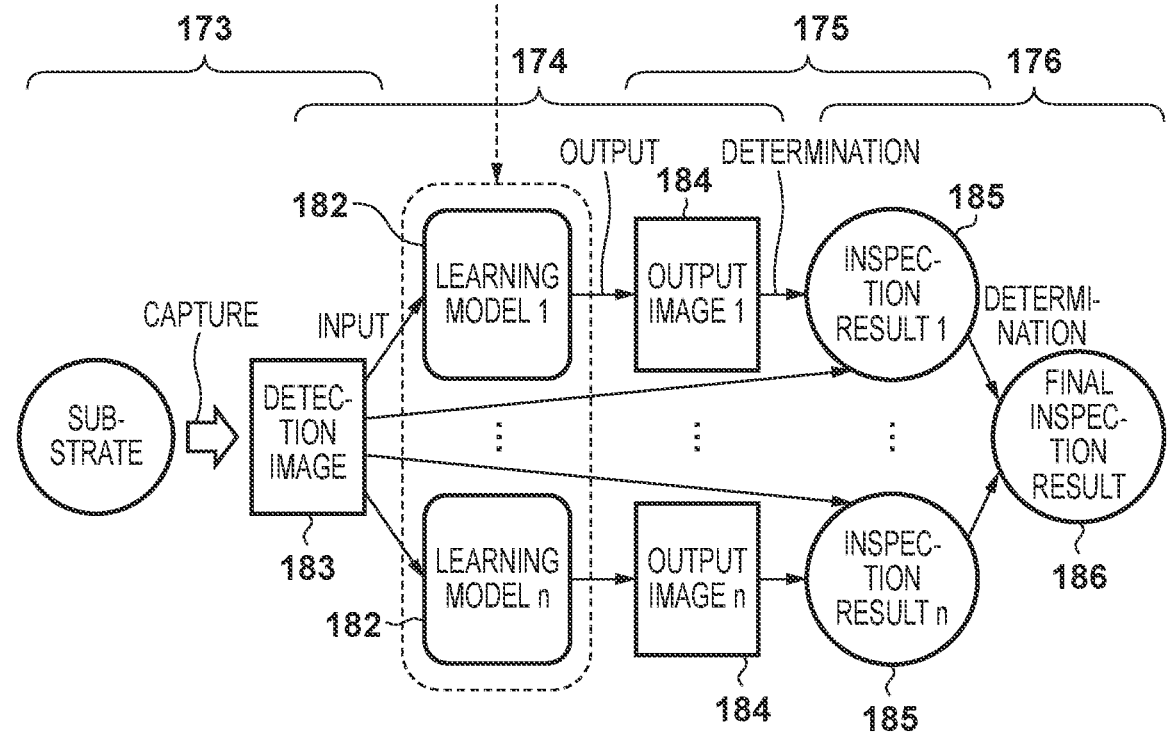

FIG. 11
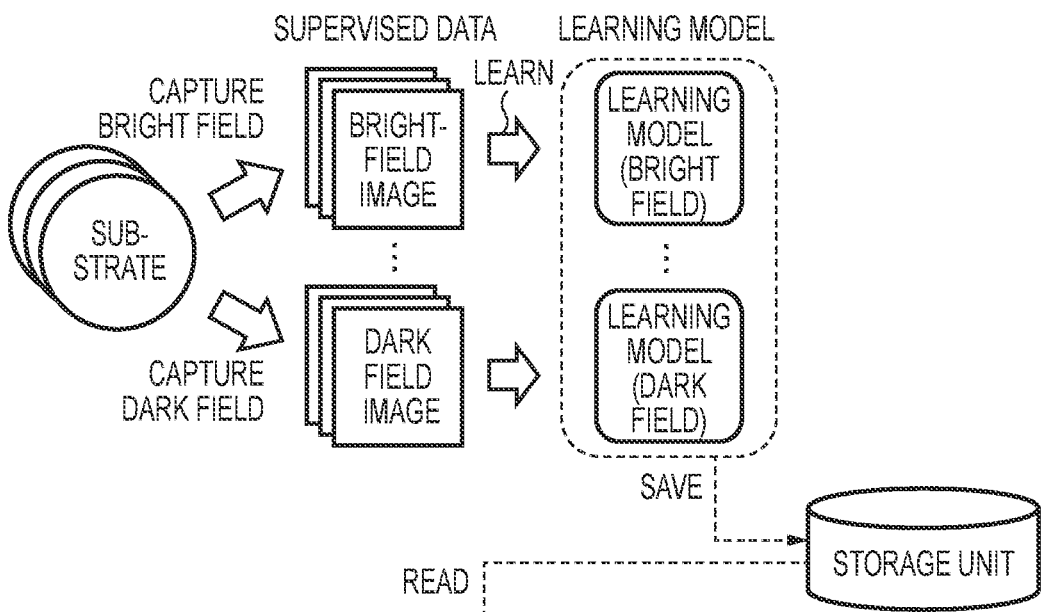
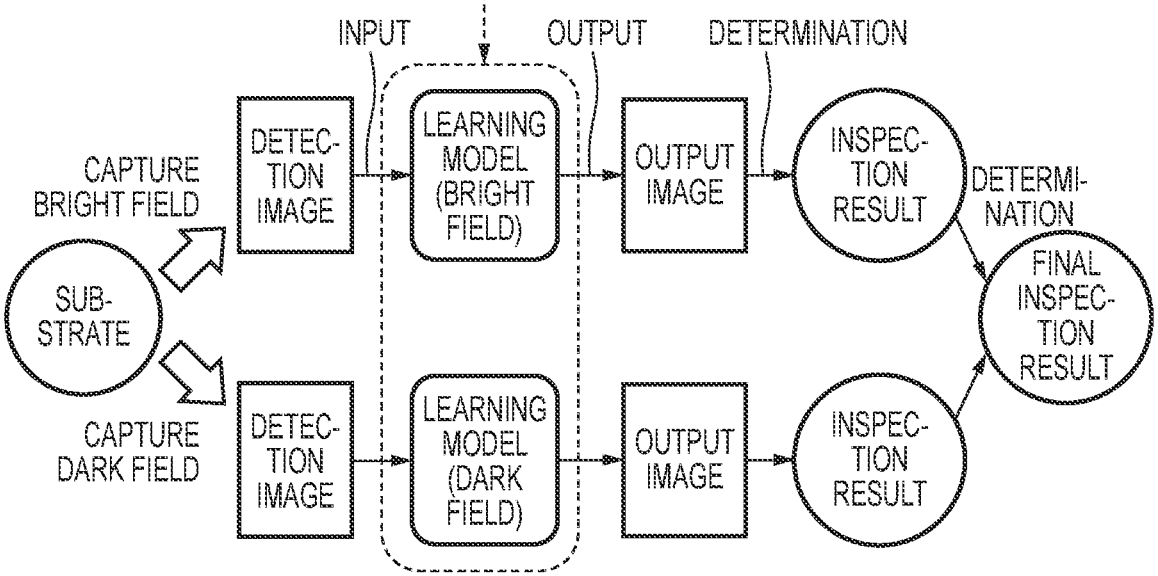

INFORMATION PROCESSING APPARATUS, DETERMINATION METHOD, IMPRINT APPARATUS, LITHOGRAPHY SYSTEM, ARTICLE MANUFACTURING METHOD, AND NON-TRANSITORY COMPUTER-READABLE STORAGE MEDIUM

BACKGROUND OF THE INVENTION

Field of the Invention

The present invention relates to an information processing apparatus, a determination method, an imprint apparatus, a lithography system, an article manufacturing method, and a storage medium.

Description of the Related Art

A lithography technique using an exposure apparatus that transfers a pattern of an original onto a substrate via a projection optical system is known as a technique of forming a fine pattern on a substrate. Recently, an imprint technique that molds an imprint material on a substrate by using a mold and thereby transfers a fine pattern formed on the mold onto the substrate is also attracting attention. An imprint technique like this is disclosed in Japanese Patent Laid-Open No. 2019-80047.

The imprint technique includes a photocuring method as an imprint material curing method. In this photocuring method, an imprint material supplied to a shot region on a substrate is cured by irradiation with light in a state in which the imprint material is in contact with a mold, and a pattern of the cured imprint material is formed on the substrate by separating the mold from the imprint material.

If, however, the amount of an imprint material supplied on a substrate is large when forming a pattern on the substrate by using the imprint technique, the imprint material sometimes protrudes outside a shot region (to be referred to as "protrusion" hereinafter). On the other hand, if the amount of an imprint material supplied on a substrate is small, a portion in which no pattern is formed is sometimes partially formed on a shot region (to be referred to as "unfilling" hereinafter). If protrusion occurs, the portion where the imprint material protrudes becomes defective. In addition, when forming a pattern on a shot region beyond the portion where the imprint material protrudes, the protruded imprint material may come in contact with a mold and break a pattern of the mold. Also, if unfilling occurs, a pattern is partially not formed on a shot region, so the product may become defective as a semiconductor device.

Accordingly, it is necessary to observe (check) the presence/absence of protrusion and unfilling after the imprint process, and adjust the amount and position of an imprint material to be supplied on a substrate, thereby suppressing the occurrence of protrusion and unfilling. Since, however, a portion where protrusion or unfilling occurs is a very small region, the observation range is narrow, so it is necessary to check a huge number of observation images obtained by a high-powered microscope, but it is unrealistic to check a huge number of observation images by manpower. Therefore, demand has arisen for a technique that inspects protrusion and unfilling from observation images and determines a pattern formation defect (to be referred to as "a formation defect" hereinafter) caused by protrusion or unfilling without manpower.

Also, an observation image obtained by a microscope changes its brightness in accordance with the reflectance on the substrate surface or with thin-film interference in a layer (an imprint material film) formed on the substrate. Accordingly, the way the observation image looks changes due to variations in thickness (film thickness) of the layer formed on the substrate. Furthermore, the film thickness of a portion where protrusion or unfilling has occurred is not always constant, so the portion where protrusion or unfilling has occurred does not always have brightness different from that of the circumference (a sufficient contrast is not always obtained).

SUMMARY OF THE INVENTION

The present invention provides an information processing apparatus advantageous in determining the presence/absence of a formation defect of a pattern formed on a substrate.

According to one aspect of the present invention, there is provided an information processing apparatus for determining, for a substrate having undergone an imprint process that forms a pattern of an imprint material on the substrate by using a mold, presence/absence of a formation defect of the pattern, including a generating unit configured to generate learning models in one-to-one correspondence with a plurality of different illumination conditions by using images obtained by capturing images of a plurality of substrates on which the pattern is formed under the plurality of illumination conditions, and containing the pattern, an obtaining unit configured to input the images obtained by capturing images of the substrates having undergone the imprint process and containing the pattern, to a plurality of learning models generated by the generating unit, and obtain a temporary determination result temporarily indicating the presence/absence of a formation defect of the pattern from each of the plurality of learning models, and a determination unit configured to determine the presence/absence of a formation defect of the pattern on the substrate having undergone the imprint process, based on a plurality of temporary determination results obtained by the obtaining unit.

Further features of the present invention will become apparent from the following description of exemplary embodiments (with reference to the attached drawings).

BRIEF DESCRIPTION OF THE DRAWINGS

FIGS. 1A and 1B are schematic views showing the arrangement of an imprint apparatus as one aspect of the present invention.

FIGS. 7A and 7B are views for explaining an outline of an auto encoder.

FIG. 8 is a view schematically showing an inspection process according to this embodiment.

FIG. 11 is a view schematically showing the inspection process according to this embodiment.

DESCRIPTION OF THE EMBODIMENTS

Figure 2:
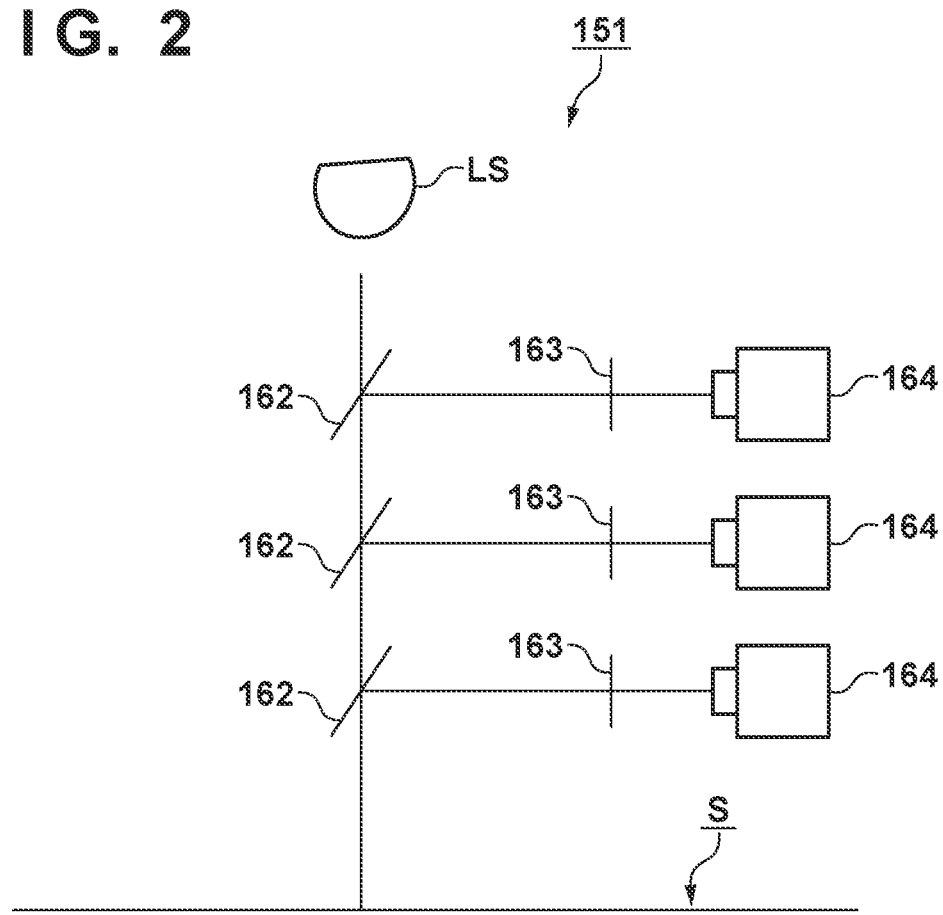
FIG. 2 is a schematic view showing an example of the arrangement of a wide-angle alignment measuring unit.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIGS. 1A and 1B are schematic views showing the arrangement of an imprint apparatus 100 as one aspect of the present invention. The imprint apparatus 100 is a lithography apparatus that performs an imprint process of forming a pattern of an imprint material on a substrate by using a mold. The imprint apparatus 100 brings an uncured imprint material supplied on a substrate into contact with a mold, and applies curing energy to the imprint material, thereby forming a pattern of the cured product on which a pattern of the mold is transferred.

As the imprint material, a material to be cured by receiving curing energy (curable composition) is used. As the curing energy, an electromagnetic wave or heat can be used. The electromagnetic wave includes, for example, light selected from the wavelength range of 10 nm (inclusive) to 1 mm (inclusive) and, more specifically, infrared light, a visible light beam, or ultraviolet light. The curable composition is a composition cured by light irradiation or heating. A photo-curable composition cured by light irradiation contains at least a polymerizable compound and a photopolymerization initiator, and may further contain a nonpolymerizable compound or a solvent, as needed. The nonpolymerizable compound is at least one material selected from the group consisting of a sensitizer, a hydrogen donor, an internal mold release agent, a surfactant, an antioxidant, and a polymer component. The viscosity (the viscosity at 25° C.) of the curable composition is, for example, 1 mPa·s (inclusive) to 100 mPa·s (inclusive).

As the material of the substrate, for example, glass, a ceramic, a metal, a semiconductor, a resin, or the like is used. A member made of a material different from the substrate may be provided on the surface of the substrate, as needed. The substrate includes, for example, a silicon wafer, a compound semiconductor wafer, or silica glass.

In the specification and the accompanying drawings, directions will be indicated on an XYZ coordinate system in which directions parallel to the surface of a substrate S are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are θX, θY, and θZ, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the θX-axis, the θY-axis, and the θZ-axis means control or driving concerning a rotation about an axis parallel to the X-axis, a rotation about an axis parallel to the Y-axis, and a rotation about an axis parallel to the Z-axis, respectively. In addition, a position is information that is specified based on coordinates on the X-, Y-, and Z-axes, and an orientation is information that is specified by values on the θX-, θY-, and θZ-axes. Positioning means controlling the position and/or orientation. Alignment includes controlling the position and orientation of at least one of a substrate and a mold.

The imprint apparatus 100 includes a substrate holding unit 102 for holding the substrate S, a substrate driving mechanism 105 for moving the substrate S by driving the substrate holding unit 102, a base 104 for supporting the substrate holding unit 102, and a position measuring unit 103 for measuring the position of the substrate holding unit 102. The substrate driving mechanism 105 includes a motor such as a linear motor.

The imprint apparatus 100 also includes a mold holding unit 121 for holding a mold M, a mold driving mechanism 122 for moving the mold M by driving the mold holding unit 121, and a support structure 130 for supporting the mold driving mechanism 122. The mold driving mechanism 122 includes a motor such as a voice coil motor.

The substrate driving mechanism 105 and the mold driving mechanism 122 form a relative movement mechanism that moves at least one of the substrate S and the mold M so as to adjust the position between the substrate S and the mold M. Adjustment of the relative position between the substrate S and the mold M by the movement mechanism includes driving to bring the imprint material on the substrate S into contact with the mold M and driving to separate the mold M from the imprint material on the substrate S. In addition, adjustment of the relative position between the substrate S and the mold M by the relative movement mechanism includes positioning between the substrate S and the mold M. The substrate driving mechanism 105 is configured to drive the substrate S with respect to a plurality of axes (for example, three axes including the X-axis, Y-axis, and θZ-axis, and preferably six axes including the X-axis, Y-axis, Z-axis, θX-axis, θY-axis, and θZ-axis). The mold driving mechanism 122 is configured to drive the mold M with respect to a plurality of axes (for example, three axes including the Z-axis, θX-axis, and θY-axis, and preferably six axes including the X-axis, Y-axis, Z-axis, θX-axis, θY-axis, and θZ-axis).

The imprint apparatus 100 includes a mold transfer mechanism 140 for transferring (loading and unloading) the mold M, and a mold cleaner 150.

The mold transfer mechanism 140 is so configured as to, for example, transfer the mold M to the mold holding unit 121, or transfer the mold M from the mold holding unit 121 to a stocker (not shown) or the mold cleaner 150. The mold cleaner 150 cleans (washes) the mold M by using ultraviolet rays or a liquid chemical.

The mold holding unit 121 includes a window member 125 for forming a pressure control space CS on the side of the reverse surface (the surface opposite to a pattern region MP in which a pattern to be transferred to the substrate S is formed) of the mold M. As shown in FIG. 1B, the imprint apparatus 100 includes a deformation mechanism 123 that deforms the pattern region MP of the mold M into a convex shape toward the substrate S by controlling the pressure (cavity pressure) of the pressure control space CS.

The imprint apparatus 100 also includes a curing unit 107, an image capturing unit 112, an optical member 111, an alignment measuring unit 106, and a wide-angle alignment measuring unit 151.

The curing unit 107 irradiates, via the optical member 111, an imprint material IM filled in the space between the substrate S and the mold M with energy (for example, light such as ultraviolet rays) for curing the imprint material IM, thereby curing the imprint material IM.

The image capturing unit 112 captures images of the substrate S, the mold M, and the imprint material IM via the optical member 111 and the window member 125.

The alignment measuring unit 106 illuminates an alignment mark formed on the substrate S and an alignment mark formed on the mold M, and captures images of these marks (detects these marks), thereby measuring the relative positions of the marks. The alignment measuring unit 106 is positioned by a driving mechanism (not shown) in accordance with the position of an alignment mark of an image capturing object.

The wide-angle alignment measuring unit 151 has a field wider than that of the alignment measuring unit 106. The wide-angle alignment measuring unit 151 illuminates the alignment mark formed on the substrate S, and captures an image of the mark (detects the mark), thereby measuring the position of the substrate S. The alignment mark formed on the substrate S can be moved into the field of the alignment measuring unit 106 by measuring the position of the substrate S by the wide-angle alignment measuring unit 151.

The wide-angle alignment measuring unit 151 can also have a function of switching the wavelengths of the light (illumination light) for illuminating the alignment mark. For example, the wide-angle alignment measuring unit 151 may include a wavelength filter and a mechanism for switching to this wavelength filter.

As shown in FIG. 2, the wide-angle alignment measuring unit 151 can also be configured to be able to simultaneously obtain (capture) images having a plurality of wavelengths. More specifically, the wide-angle alignment measuring unit 151 includes a light source LS, a plurality of half mirrors 162 for branching the optical path, a plurality of wavelength filters 163 for transmitting light having different wavelengths, and a plurality of image capturing elements 164, and simultaneously obtains images having different wavelengths.

Also, the wide-angle alignment measuring unit 151 can have a function of switching the light amounts of the illumination light. For example, the wide-angle alignment measuring unit 151 can include an ND (Neutral Density) filter and a mechanism for switching to this ND filter.

The wide-angle alignment measuring unit 151 can further include a plurality of optical systems including a bright-field optical system and a dark-field optical system, and a mechanism for switching optical systems through which light from an alignment mark passes.

In addition, the wide-angle alignment measuring unit 151 can have a function of switching the polarizations of the illumination light or the light from an alignment mark. For example, the wide-angle alignment measuring unit 151 can include a plurality of polarizing filters and a mechanism for switching the plurality of polarizing filters.

The imprint apparatus 100 includes a dispenser 108 for laying out, supplying, or distributing the imprint material IM on the substrate S. The dispenser 108 discharges (supplies) the imprint material IM to the substrate S in accordance with, for example, a drop recipe indicating the layout of the imprint material IM on a substrate, so as to reproduce the layout.

The imprint apparatus 100 includes a control unit 110 for controlling each unit of the imprint apparatus 100. The control unit 110 is a versatile or dedicated information processing apparatus (computer). Note that the control unit 110 may also be a PLD (Programmable Logic Device) such as an FPGA (Field Programmable Gate Array). The control unit 110 can further be an ASIC (Application Specific Integrated Circuit).

Figure 3:
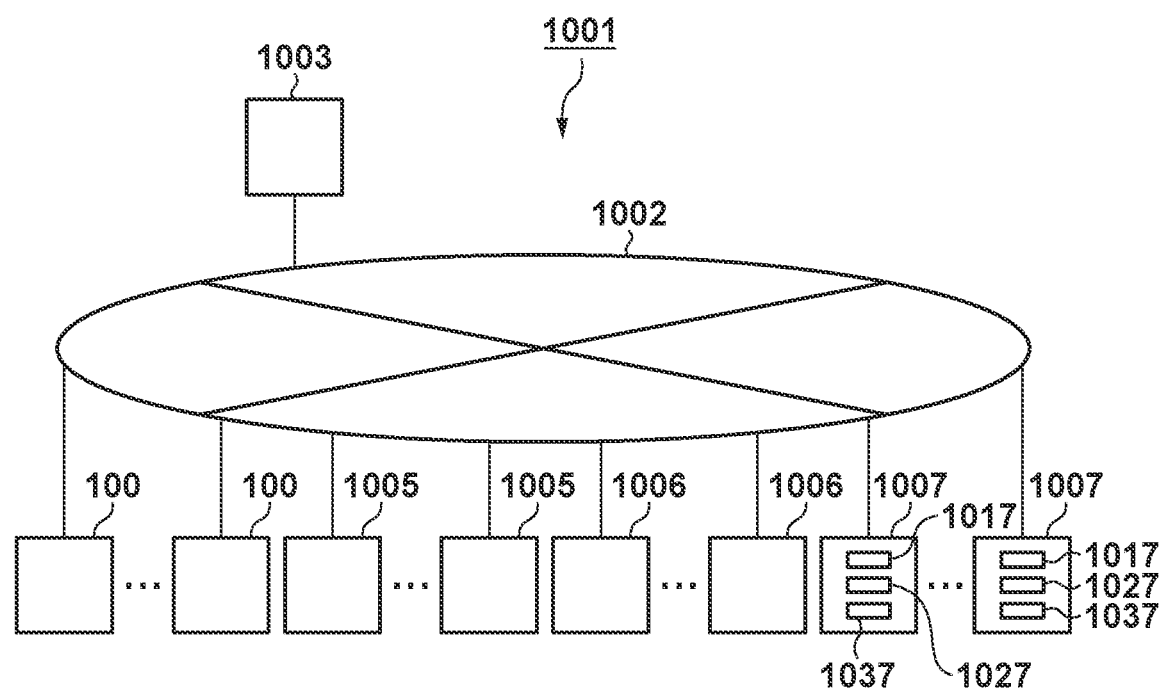
FIG. 3 is a schematic view showing the arrangement of a lithography system.

FIG. 3 is a schematic view showing the arrangement of a lithography system 1001 for manufacturing an article such as a semiconductor device. The lithography system 1001 includes one or a plurality of imprint apparatuses 100, one or a plurality of inspection apparatuses 1005, one or a plurality of processing apparatuses 1006, one or a plurality of formation defect inspection apparatuses 1007, and a control apparatus 1003. Note that the lithography system 1001 can further include one or a plurality of exposure apparatuses.

The inspection apparatus 1005 includes, for example, a superposition inspection apparatus, a CD (Critical Dimension) inspection apparatus, and an electrical characteristic inspection apparatus. The processing apparatus 1006 includes, for example, an etching apparatus and a deposition apparatus. The imprint apparatus 100, the inspection apparatus 1005, the processing apparatus 1006, the formation defect inspection apparatus 1007, and the control apparatus 1003 are connected to each other across a network 1002. In the lithography system 1001, the control apparatus 1003 as an external apparatus different from the imprint apparatus 100 controls the imprint apparatus 100, the inspection apparatus 1005, the processing apparatus 1006, and the formation defect inspection apparatus 1007.

The formation defect inspection apparatus 1007 is obtained by installing a program of a formation defect inspection in a versatile or dedicated information processing apparatus (computer). Note that the formation defect inspection apparatus 1007 may also be configured by a PLD such as an FPGA, or an ASIC. Furthermore, the formation defect inspection apparatus 1007 can be implemented by using one or both of the control unit 110 of the imprint apparatus 100 and the control apparatus 1003.

The formation defect inspection apparatus 1007 has a function of determining the presence/absence of a pattern formation defect on the substrate S having undergone the imprint process, and includes a formation unit 1017, an obtaining unit 1027, and a determination unit 1037 as modules for implementing this function. The formation unit 1017 implements a function of forming a learning model for each of a plurality of different illumination conditions by using images containing patterns obtained by capturing images of a plurality of substrates under the plurality of illumination conditions. The obtaining unit 1027 implements a function of inputting an image containing a pattern obtained by capturing an image of the substrate S to each of a plurality of learning models, and obtaining an inspection result temporarily indicating the presence/absence of a pattern formation defect from each of the plurality of learning models. The determination unit 1037 implements a function of finally determining the presence/absence of the pattern formation defect on the substrates S based on the plurality of inspection results obtained by the obtaining unit 1027. The formation defect inspection apparatus 1007 executes an inspection process of inspecting the presence/absence of a pattern formation defect on the substrate S by integrating the functions implemented by the formation unit 1017, the obtaining unit 1027, and the determination unit 1037. This inspection process will be explained in detail later.

The operations of the imprint apparatus 100 and the lithography system 1001 including the imprint apparatus 100 will be explained with reference to FIG. 4. At least one of the control unit 110 and the control apparatus 1003 controls these operations. In this embodiment, after the imprint process is performed, an image of the peripheral portion of a shot region (a prospective pattern formation region) having undergone the imprint process is obtained, and (pattern formation defects caused by) protrusion and unfilling are inspected (detected) by using the image. Also, this embodiment uses machine learning when inspecting protrusion and unfilling, and this machine learning can implement an inspection capable of flexibly corresponding to a change in the way an image looks by using learning models corresponding to a plurality of conditions.

In step S101, the substrate S is loaded into the imprint apparatus 100. More specifically, the substrate S is transferred from a transfer source (a relay unit for a pre-processing apparatus) to the substrate holding unit 102 by using the substrate transfer mechanism (not shown), and held by the substrate holding unit 102. The position of the substrate S held by the substrate holding unit 102 is measured by detecting the alignment mark formed on the substrate S by the wide-angle alignment measuring unit 151, and the substrate S is positioned based on the measurement result.

Reference numerals S102 to S106 denote steps of the imprint process (pattern formation) for an imprint target shot region of a plurality of shot regions on the substrate.

In step S102, the imprint material IM is laid out (supplied) to the imprint target shot region on the substrate. More specifically, the dispenser 108 discharges the imprint material IM while the substrate S is moved by the substrate driving mechanism 105, thereby laying out the imprint material IM in the imprint target shot region.

In step S103, the imprint material IM on the imprint target shot region and (the pattern region MP of) the mold M are brought into contact with each other. More specifically, the imprint material IM on the imprint target shot region and the mold M are brought into contact with each other by relatively moving the substrate S and the mold M by using at least one of the substrate driving mechanism 105 and the mold driving mechanism 122. For example, the mold driving mechanism 122 moves the mold M so that the mold M comes in contact with the imprint material IM on the imprint target shot region. Note that when bringing the imprint material IM on the imprint target shot region and the mold M into contact with each other, the pattern region MP of the mold M is desirably deformed into a convex shape toward the substrate S by the deformation mechanism 123.

In step S104, alignment of the substrate S and the mold M, that is, alignment of the imprint target shot region and the pattern region MP of the mold M is performed. More specifically, while the alignment measuring unit 106 is measuring the relative positions of the alignment mark of the imprint target shot region and the alignment mark of the mold M, alignment is performed such that the relative positions fall within an allowable range of target relative positions. For example, the substrate S and the mold M are moved relative to each other by at least one of the substrate driving mechanism 105 and the mold driving mechanism 122, thereby making the relative positions fall within the target relative position allowable range. The target relative positions are set in accordance with correction values determined from, for example, the past results obtained by the superposition inspection apparatus.

In step S105, the imprint material IM on the imprint target shot region is cured in a state in which the imprint material IM and the mold M are in contact with each other. More specifically, energy for curing the imprint material IM is applied from the curing unit 107 to the imprint material IM between the substrate S and the pattern region MP of the mold M. Consequently, the imprint material IM is cured, and the cured product (pattern) of the imprint material IM is formed in the imprint target shot region.

In step S106, the mold M is released (mold release) from the cured imprint material IM on the imprint target shot region. More specifically, the substrate S and the mold M are moved relative to each other by at least one of the substrate driving mechanism 105 and the mold driving mechanism 122 so as to separate the cured product of the imprint material IM and the pattern region MP of the mold M. For example, the mold driving mechanism 122 moves the mold M so as to separate the mold M from the cured product of the imprint material IM on the imprint target shot region. Note that when releasing the mold M from the cured imprint material IM on the imprint target shot region, the pattern region MP of the mold M is preferably deformed into a convex shape toward the substrate S by the deformation mechanism 123. In addition, the image capturing unit 112 captures images of the substrate S, the mold M, and the imprint material IM, and the separation state between the imprint material and the mold M is observed based on these images.

In step S107, whether the imprint process (steps S102 to S106) has been performed in all shot regions on the substrate is determined. If the imprint process has been performed in not all shot regions, the process returns to step S102 in order to perform the imprint process in the next imprint target shot region. On the other hand, if the imprint process has been performed in all shot regions, the process advances to step S108.

In step S108, an image of the shot region (and its peripheral portion) of the substrate S having undergone the imprint process is captured, thereby obtaining an image containing the pattern formed in the shot region. Image capturing of each shot region on the substrate can be performed by using, for example, the wide-angle alignment measuring unit 151. If the field of the wide-angle alignment measuring unit 151 is narrower than the shot region, an image of a desired region (shot region) can be obtained by performing image capturing a plurality of times while changing the position of the substrate S by the substrate driving mechanism 105.

The image obtained in step S108 is used as an image for learning in relation to a process of inspecting (determining) the presence/absence of a pattern formation defect on the substrate S as will be described later, or as an image for inspection. This embodiment will be explained by taking, as an example, a case in which an image is obtained by using the wide-angle alignment measuring unit 151, but the present invention is not limited to this. For example, a similar image can also be obtained by using the alignment measuring unit 106 or the image capturing unit 112.

Also, in this embodiment, an image of each shot region is captured after the imprint process is performed in all shot regions on the substrate. However, the present invention is not limited to this. For example, after the imprint process is performed in one shot region on the substrate (that is, after step S106), an image of the shot region can be captured. Alternatively, after the substrate S is unloaded from the imprint apparatus 100, an image of each shot region on the substrate can be captured by using an external apparatus.

In step S109, the substrate S is unloaded from the imprint apparatus 100. More specifically, the substrate S is transferred from the substrate holding unit 102 to a transfer destination (for example, a relay unit for a post-processing apparatus) by using the substrate transfer mechanism (not shown).

Figure 4:
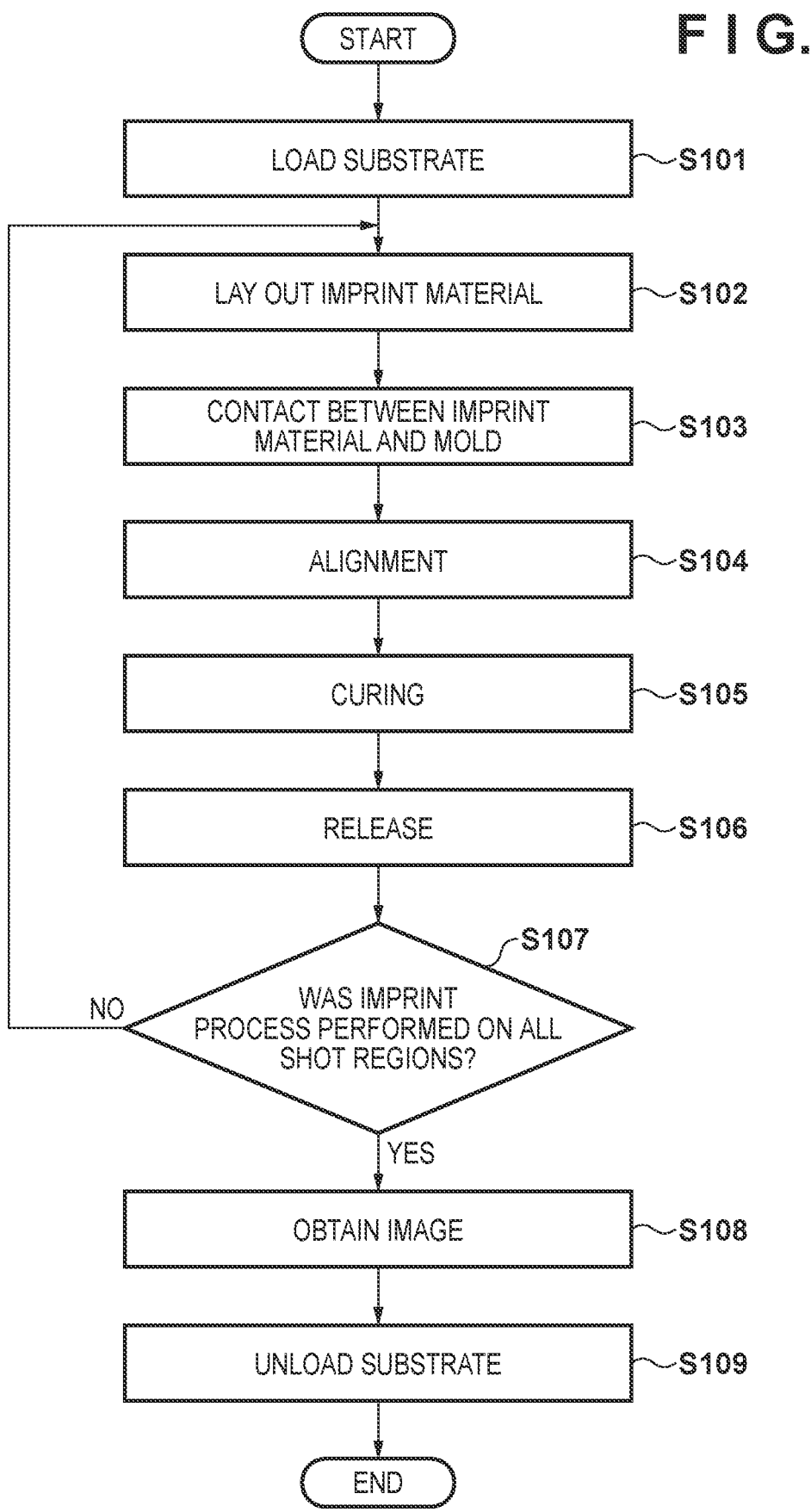
FIG. 4 is a flowchart for explaining the operations of the imprint apparatus shown in FIG. 1 and the lithography system shown in FIG. 3.

Note that when processing a lot including a plurality of substrates, each step shown in FIG. 4 is performed on each of the plurality of substrates.

Next, an inspection process (a determination method of determining the presence/absence of a pattern formation defect) that is performed after the imprint process in this embodiment and inspects the presence/absence of a pattern formation defect on the substrate S will be explained. As described previously, a pattern formation defect occurs due to protrusion or unfilling.

Figure 5A:
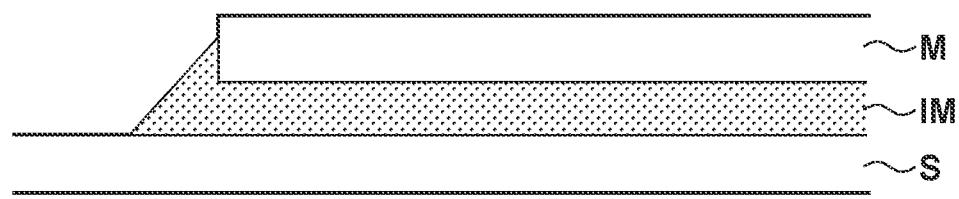
FIGS. 5A and 5B are side views showing states in which an imprint material on a substrate is in contact with a mold.
Figure 5B:
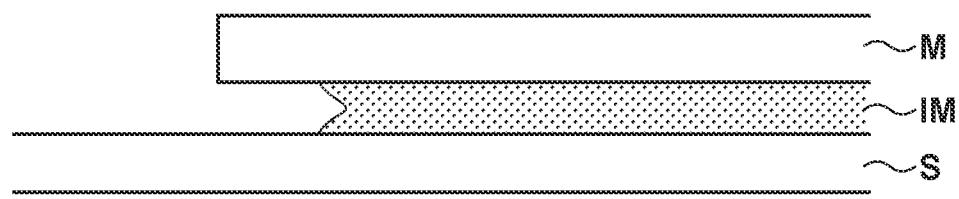

FIGS. 5A and 5B are side views showing the state (for example, step S105) in which the imprint material IM on the substrate and the mold M are in contact with each other. As shown in FIG. 5A, protrusion means that the imprint material IM protrudes from the shot region (the mold M) on the substrate (protrusion of the imprint material IM to outside a prospective pattern formation region). As shown in FIG. 5B, unfilling means that a portion not filled with the imprint material IM is formed between the mold M and the substrate S.

Figure 6A:
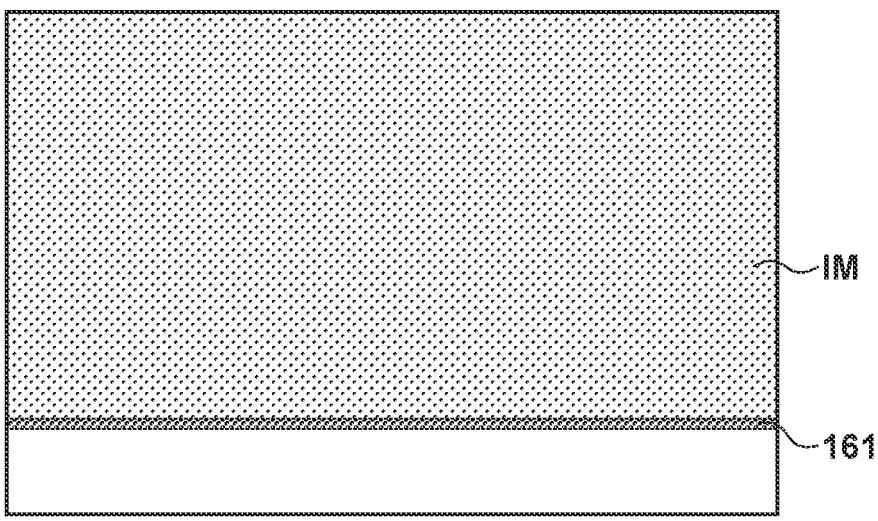
FIGS. 6A to 6C are views showing examples of an image obtained in step S108 of FIG. 4.
Figure 6B:
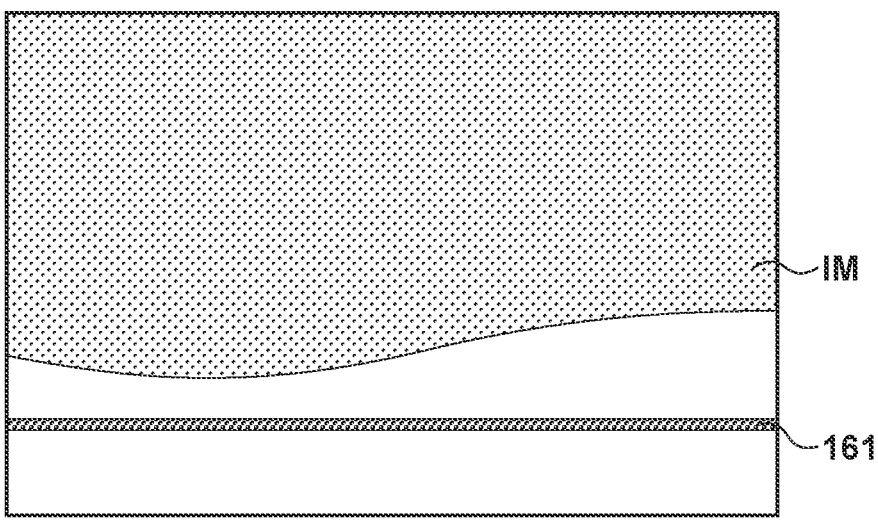
Figure 6C:
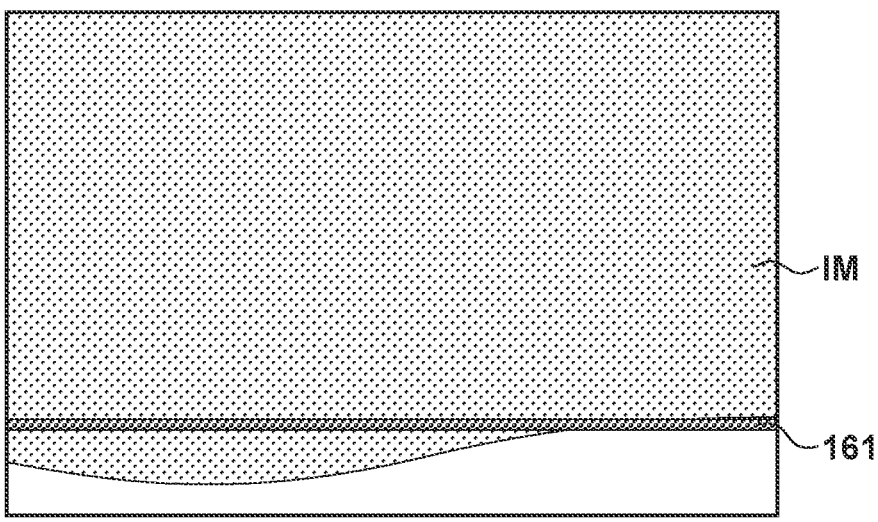

An image obtained in step S108 when protrusion shown in FIG. 5A or unfilling shown in FIG. 5B occurs will be explained with reference to FIGS. 6A, 6B, and 6C. In a normal state, that is, when neither protrusion nor unfilling occurs, as shown in FIG. 6A, a pattern is formed by filling the imprint material IM to a boundary 161 of a shot region. Note that FIGS. 6A to 6C illustrate examples in each of which a pattern is formed in a shot region in the upper portion of an image. On the other hand, if unfilling occurs, as shown in FIG. 6B, an image of a portion in which the imprint material IM is not filled to the boundary 161 of a shot region is captured as a white (or black) portion. Also, if protrusion occurs, as shown in FIG. 6C, an image of the imprint material IM protruding from the boundary 161 of a shot region is captured as a black (or white) portion.

In the inspection process according to this embodiment, images of a plurality of substrates on which patterns are formed are captured under a plurality of different illumination conditions, and learning models for the plurality of illumination conditions are generated by using a plurality of obtained images. In this embodiment, learning models for the plurality of illumination conditions are generated by using an auto encoder as one machine learning method, and inspection is performed by using these learning models for the plurality of illumination conditions.

FIGS. 7A and 7B are views for explaining an outline of the auto encoder. As shown in FIG. 7A, the auto encoder generates a learning model by directly using normal input data (for example, an image) as supervised data. As shown in FIG. 7B, when abnormal data (data containing a portion different from normal data) is input to a learning model having learned by using a sufficient amount of data, data from which the abnormal portion is removed is output (estimated).

In this embodiment, a learning model is generated in advance by using normal data (an image) having no formation defect as input data and supervised data. Then, in the inspection process, an image as a formation defect inspection (determination) target is input to the learning model, and output data is obtained. As described above, when normal data (an image having no formation defect) is input, the same data as the input data is output as the output data. On the other hand, if abnormal data (an image having a formation defect (protrusion or unfilling)) is input, normal data (an image having no formation defect) estimated from the input data is output as the output data. As shown in FIG. 7B, therefore, the difference between the input data (input image) and the output data (output image) represents the formation defect portion, and the presence/absence of a formation defect (protrusion or unfilling) is inspected (determined) based on the presence/absence of the difference.

An image for use in the inspection of the presence/absence of a formation defect will be explained in detail below. The contrast of an image (the brightness of each pixel) for use in the inspection of the presence/absence of a formation defect depends on, for example, the reflectance of the corresponding portion of a substrate and the state of thin-film interference of a thin film (a cured film of the imprint material). The thin-film interference is interference between light reflected by the thin-film upper surface and light reflected by the substrate obverse surface (the thin-film lower surface), and the light intensity changes in accordance with the thickness of the thin film and the wavelength of the illumination light.

A pattern (thin film) to be formed on a substrate is manufactured with a sufficiently stable film thickness from the viewpoint of the manufacture of a semiconductor device, but has a fluctuation to such an extent that it exerts influence from the viewpoint of thin-film interference. Therefore, if an image used when generating a learning model and an image to be used in the inspection of the presence/absence of a formation defect are different in film thickness of a pattern formed on a substrate, the contrasts of the images are sometimes different. Accordingly, there is the possibility that, for example, even an image having no formation defect is found to have a formation defect.

In this embodiment, therefore, a plurality of images obtained by image capturing under a plurality of illumination conditions are used, and a plurality of learning models are generated in one-to-one correspondence with the plurality of illumination conditions. Then, the presence/absence of a formation defect is finally determined based on a temporary determination result (a plurality of temporary determination results) obtained from each of the plurality of learning models and temporarily indicating the presence/absence of a formation defect. The illumination conditions include, for example, the wavelength and the light amount of the illumination light (light that illuminates a substrate).

Figure 9:
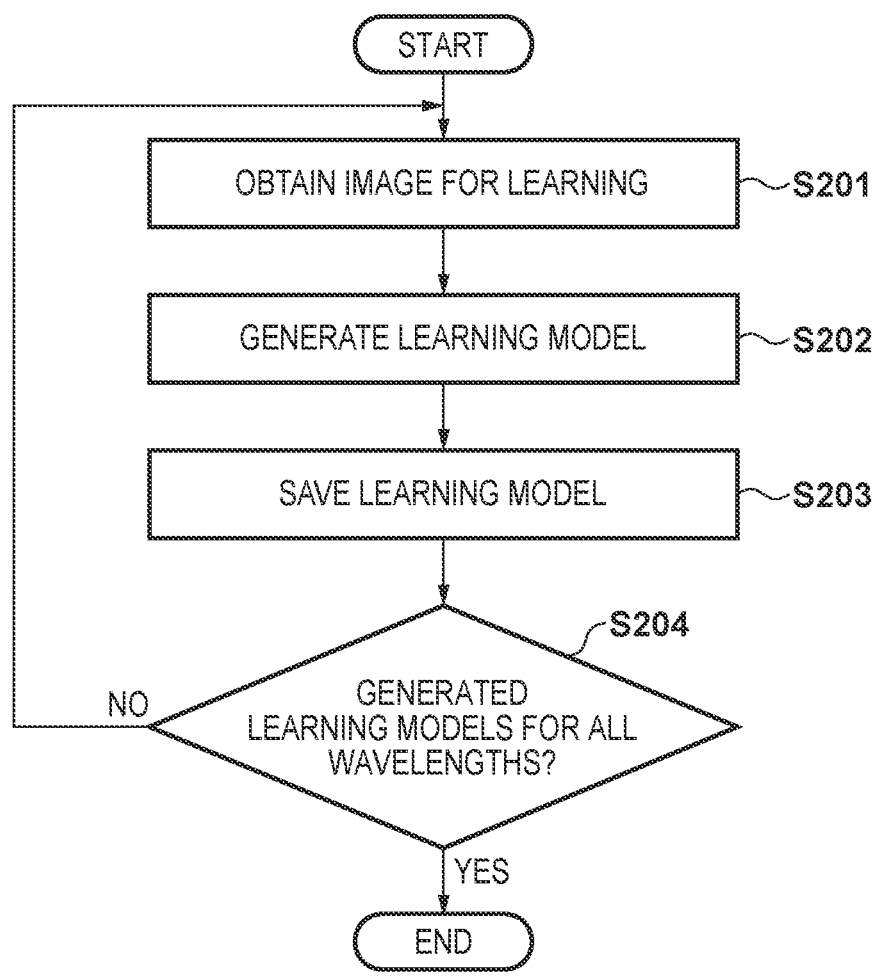
FIG. 9 is a flowchart for explaining processing when forming a learning model according to this embodiment.
Figure 10:
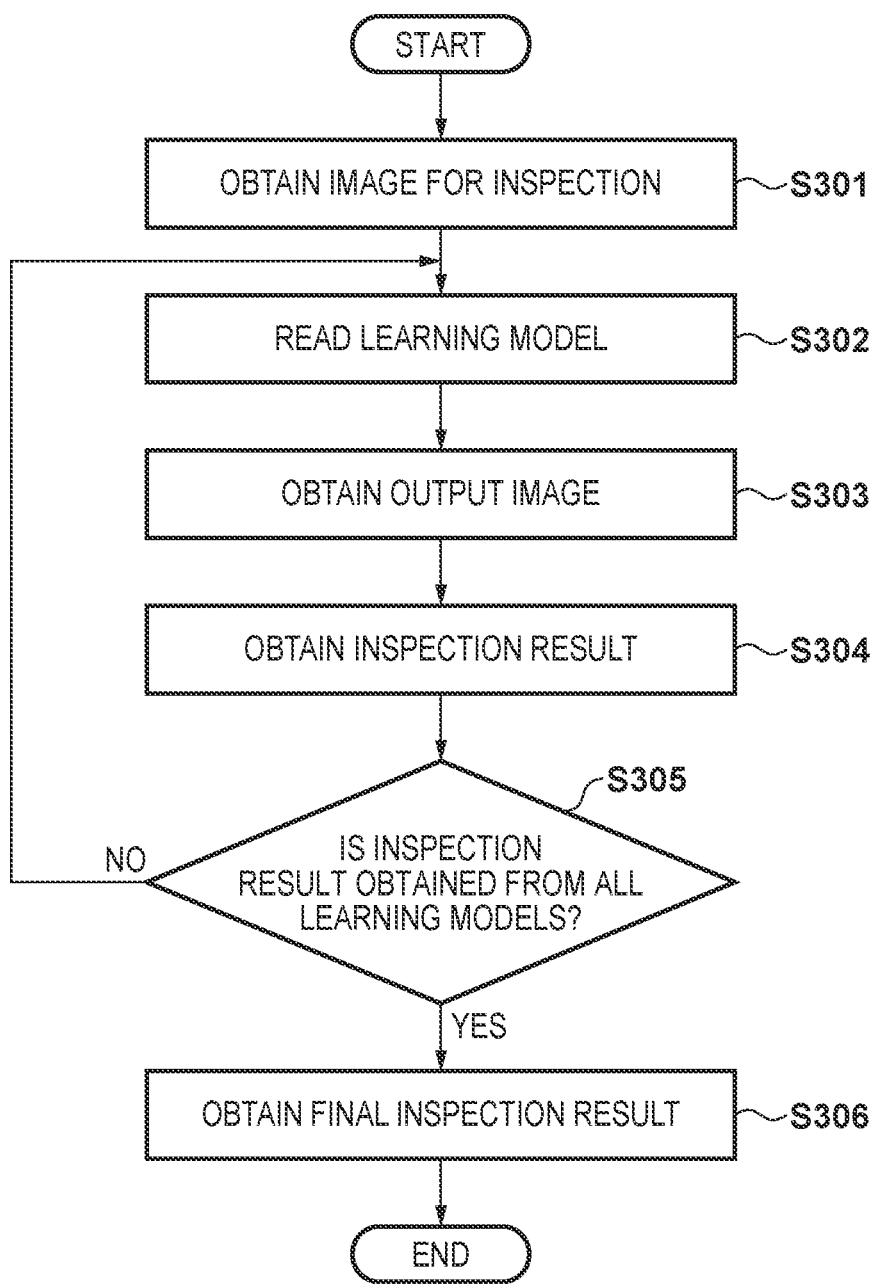
FIG. 10 is a flowchart for explaining processing when actually inspecting the presence/absence of a formation defect according to this embodiment.

FIG. 8 is a view schematically showing the inspection process of this embodiment. As shown in FIG. 8, the inspection process of this embodiment is roughly divided into processing when generating learning models (in learning) and processing when actually inspecting the presence/absence of a formation defect (in inspection). FIG. 9 is a flowchart for explaining the processing when generating learning models in this embodiment. FIG. 10 is a flowchart for explaining the processing when actually inspecting the presence/absence of a formation defect in this embodiment. The explanation will be made by taking, as an example, a case in which the wavelength of the illumination light is adopted as the illumination condition, that is, illumination light components having a plurality of different wavelengths are used. As described above, the inspection process of this embodiment can be performed by the formation defect inspection apparatus 1007, the control unit 110 of the imprint apparatus 100, or the control apparatus 1003.

The processing when generating learning models will be explained with reference to FIGS. 8 and 9. Learning models corresponding to different wavelengths are generated and saved by repeating steps S201, S202, and S203 shown in FIG. 9.

In step S201, images for learning are obtained. More specifically, while substrates on which patterns are formed by each of illumination light having the wavelength of illumination light to be used when obtaining an image for inspection and illumination light having wavelengths before and after that wavelength are illuminated, images (images for learning) containing the patterns are obtained by capturing images of these substrates. Each image for learning is obtained for each of a plurality of substrates and for each shot region on the substrate. The number of images for learning is preferably as large as possible. Step S201 is equivalent to step 170 shown in FIG. 8.

In step S202, learning models corresponding to the different wavelengths are generated based on the plurality of images obtained in step S201. More specifically, a neural network generated beforehand is optimized by using an image 181 as input data and output data (supervised data) of the neural network, thereby generating learning models 182 (neural networks) corresponding to the individual wavelengths. Step S202 is equivalent to step 171 shown in FIG. 8.

In step S203, the learning models generated in step S202 are saved. Step S203 is equivalent to step 172 shown in FIG. 8.

In step S204, whether learning models have been generated for all the preset wavelengths (whether steps S201 to S203 have been performed on the illumination light of all the wavelengths) is determined. If learning models have been generated for not all the wavelengths, the process returns to step S201 in order to generate a learning model for the next wavelength. On the other hand, if learning models have been generated for all the wavelengths, the process is terminated.

As described above, variations in film thickness of patterns to be formed on substrates can artificially be reproduced by changing the wavelength of the illumination light to a plurality of different wavelengths. Accordingly, each of a plurality of images obtained by changing the wavelengths of the illumination light contains information of the film thickness of the pattern formed on the substrate.

The processing when actually inspecting the presence/absence of a formation defect will be explained with reference to FIGS. 8 and 10.

In step S301, an image for inspection is obtained. More specifically, the image obtained in step S108 (the image obtained by using illumination light having the preset wavelength) is obtained as the image for inspection. Step S301 is equivalent to step 173 shown in FIG. 8.

In step S302, the learning model 182 saved in step S203 is loaded. Step S302 is equivalent to a part of step 172 shown in FIG. 8.

In step S303, an output image 184 (output data) is obtained by inputting an image 183 obtained in step S301 to the learning model 182 loaded in step S302. Step S303 is equivalent to step 174 shown in FIG. 8.

In step S304, the difference between the image 183 obtained in step S301 and the output image 184 obtained in step S303 is obtained, and an inspection result 185 (a temporary determination result) temporarily indicating the presence/absence of a formation defect is obtained based on the difference. For example, if the difference between the image 183 and the output image 184 is larger than a preset threshold, the inspection result 185 indicating the presence of a formation defect (protrusion or unfilling) is obtained. On the other hand, if the difference between the image 183 and the output image 184 is equal to or smaller than the preset threshold, the inspection result 185 indicating the absence of a formation defect is obtained. Step S304 is equivalent to step 175 shown in FIG. 8.

In step S305, whether inspection results have been obtained from all the learning models 182 (that is, whether steps S302 to S304 have been performed on all the learning models 182 generated in step S202) is determined. If inspection results have been obtained from not all the learning models 182, the process advances to step S302 in order to obtain an inspection result from the next learning model 182. On the other hand, if inspection results have been obtained from all the learning models 182, the process advances to step S306.

As described above, steps S302 to S304 are performed on the plurality of learning models 182 generated in step S202, thereby obtaining a plurality of inspection results 185 in one-to-one correspondence with the plurality of learning models 182.

In step S306, the presence/absence of a pattern formation defect on the substrate S having undergone the imprint process is determined based on each inspection result 185 (the plurality of inspection results) corresponding to each learning model 182 obtained in step S304, thereby obtaining a final inspection result 186. More specifically, if at least one of the plurality of inspection results 185 indicates the absence of a formation defect, it is finally determined that there is no pattern formation defect on the substrate S. On the other hand, if all the inspection results 185 indicate the presence of a formation defect, it is finally determined that there is a pattern formation defect on the substrate S. This is so because if there is no formation defect, the absence of a formation defect is probably determined by a given learning model (that is, a learning model for which the relationship between the film thickness of the pattern and the wavelength of the illumination light is close to the substrate S) of the plurality of learning models 182. However, if, among the plurality of inspection results 185, the number of inspection results 185 indicating the absence of a formation defect is larger than that of inspection results 185 indicating the presence of a formation defect, it is possible to finally determine that there is no pattern formation defect on the substrate S. Thus, the final inspection result 186 can be obtained by the majority decision of the inspection results 185. Step S306 is equivalent to step 176 shown in FIG. 8.

This embodiment has been explained by taking, as an example, a case in which a plurality of images are obtained by switching the wavelengths of illumination light. However, images of a plurality of wavelengths can be obtained by using, for example, the wide-angle alignment measuring unit 151 having the configuration shown in FIG. 2.

Also, this embodiment has been explained by taking, as an example, a case in which the wavelength of illumination light is used as the illumination condition, but the present invention is not limited to this. For example, it is also possible to adopt the light amount of illumination light as the illumination condition, and obtain a plurality of images by changing the light amount of illumination light, instead of changing the wavelength of illumination light, when performing learning.

Furthermore, a teaming model can also be obtained by using an image obtained by using conditions under which largely different images are obtained, instead of the illumination condition. More specifically, learning models can be obtained by using images obtained by different detection methods (for example, a bright field and a dark field), or images obtained by using a plurality of polarizing filters (a first polarizing filter and a second polarizing filter). FIG. 11 is a view schematically showing an inspection process when obtaining a plurality of images by switching the dark field and the bright field. In this case, a leaning model (first learning model) corresponding to the bright field and a learning model (second learning model) corresponding to the dark field are generated by using images obtained by capturing, in the bright field and the dark field, images of a plurality of substrates on which patterns are formed. Then, the image obtained by capturing, in the bright field, an image of the substrate S having undergone the imprint process is input to the learning model for the bright field, thereby obtaining an inspection result (a first temporary determination result) temporarily indicating the presence/absence of a formation defect. Similarly, the image obtained by capturing, in the dark field, an image of the substrate S having undergone the imprint process is input to the learning model for the dark field, thereby obtaining an inspection result (a second temporary determination result) temporarily indicating the presence/absence of a formation defect. Subsequently, the presence/absence of a pattern formation defect on the substrate S having undergone the imprint process is finally determined based on the inspection results obtained from the learning model for the bright field and the learning model for the dark field, thereby obtaining a final inspection result. Note that when adopting conditions under which largely different images are obtained, the final inspection result is preferably obtained by the majority decision of inspection results obtained from the individual learning models. It is also possible to obtain the final inspection result by using the average value of the areas of formation defect portions in output images from the individual learning models as a final formation defect area, and comparing this final formation defect area with a preset threshold. In this case, the inspection accuracy can be improved because the final inspection result can be obtained from a larger number of information. Likewise, even when obtaining a plurality of images by switching a plurality of polarizing filters, learning models are generated in one-to-one correspondence with the plurality of polarizing filters, and the presence/absence of a pattern formation defect is determined based on results obtained from these learning models.

In this embodiment as described above, even when the way an image for inspection looks changes due to variations in film thickness of a pattern formed on a substrate, the presence/absence of a pattern formation defect can be detected with high accuracy by using a plurality of learning models as described above. Accordingly, this embodiment can provide a technique advantageous in determining the presence/absence of a formation defect of a pattern formed on a substrate, that is, a technique capable of inspecting a pattern formation defect with higher accuracy.

A pattern of a cured product formed using the imprint apparatus 100 and the lithography system 1001 is used permanently for at least some of various kinds of articles or temporarily when manufacturing various kinds of articles. The articles are an electric circuit element, an optical element, a MEMS, a recording element, a sensor, a mold, and the like. Examples of the electric circuit element are volatile and nonvolatile semiconductor memories such as a DRAM, a SRAM, a flash memory, and a MRAM and semiconductor elements such as an LSI, a CCD, an image sensor, and an FPGA. Examples of the mold are molds for imprint.

The pattern of the cured product is directly used as the constituent member of at least some of the above-described articles or used temporarily as a resist mask. After etching or ion implantation is performed in the substrate processing step, the resist mask is removed.

Figure 12A:
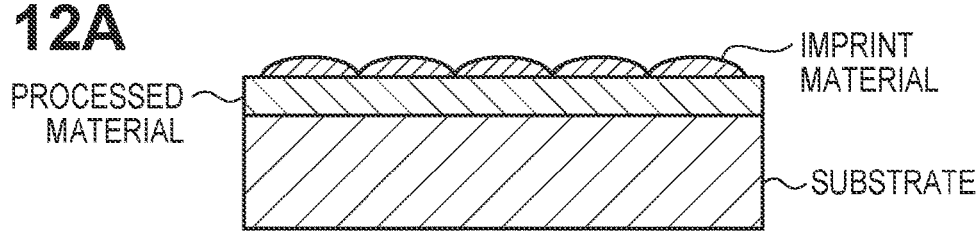
FIGS. 12A to 12F are views for explaining an article manufacturing method.

A detailed method of manufacturing an article will be described next. As shown in FIG. 12A, a substrate 1 such as a silicon wafer with a processed material such as an insulator formed on the surface is prepared. Next, an imprint material is applied to the surface of the processed material by an inkjet method or the like. A state in which the imprint material is applied as a plurality of droplets onto the substrate is shown here.

Figure 12B:
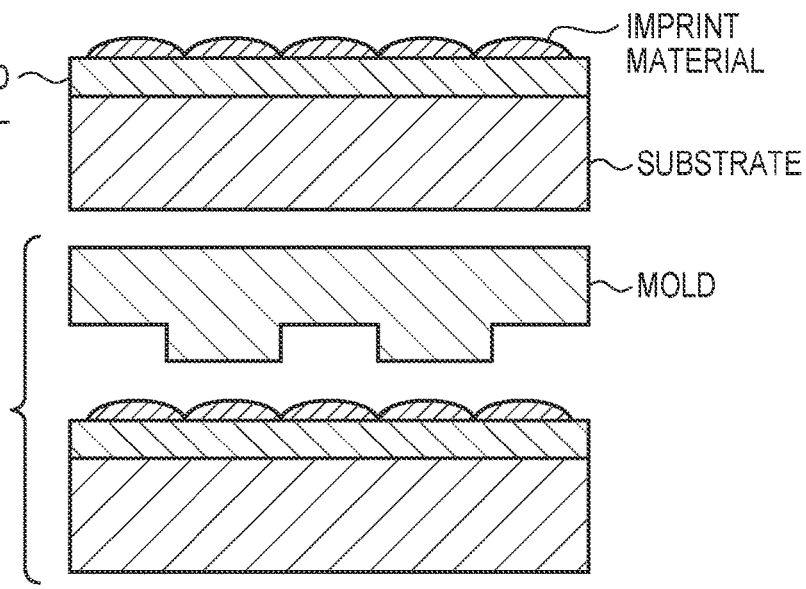
Figure 12C:
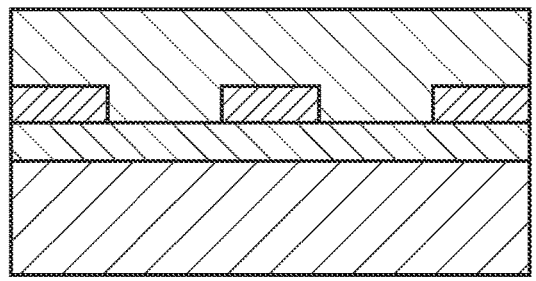

As shown in FIG. 12B, a side of a mold for imprint with an uneven pattern is directed to and caused to face the imprint material on the substrate. As shown in FIG. 12C, the substrate to which the imprint material is applied is brought into contact with the mold, and a pressure is applied. The gap between the mold and the processed material is filled with the imprint material. In this state, when the imprint material is irradiated with light serving as curing energy through the mold, the imprint material is cured.

Figure 12D:
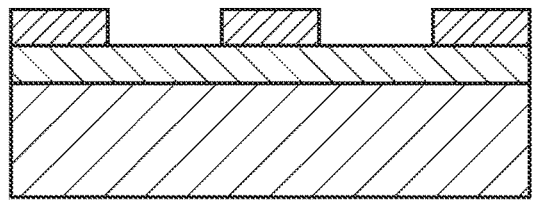

As shown in FIG. 12D, after the imprint material is cured, the mold is separated from the substrate. Thus, the pattern of the cured product of the imprint material is formed on the substrate. In the pattern of the cured product, the concave portion of the mold corresponds to the convex portion of the cured product, and the convex portion of the mold corresponds to the concave portion of the cured product. That is, the uneven pattern of the mold is transferred to the imprint material.

Figure 12E:
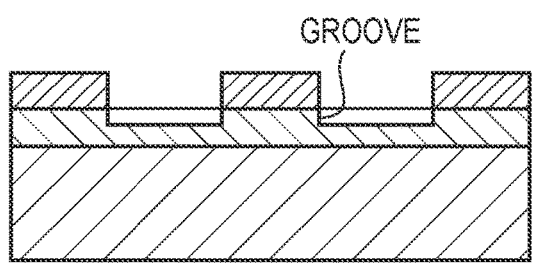
Figure 12F:
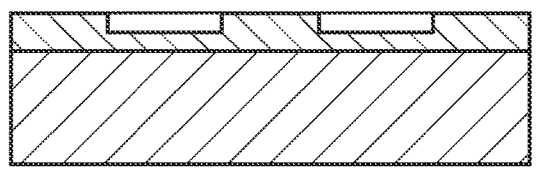

As shown in FIG. 12E, when etching is performed using the pattern of the cured product as an etching resistant mask, a portion of the surface of the processed material where the cured product does not exist or remains thin is removed to form a groove. As shown in FIG. 12F, when the pattern of the cured product is removed, an article with the grooves formed in the surface of the processed material can be obtained. Here, the pattern of the cured product is removed. However, instead of processing or removing the pattern of the cured product, it may be used as, for example, an interlayer dielectric film included in a semiconductor element or the like, that is, a constituent member of an article.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or mom of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2019-180717 filed on Sep. 30, 2019, which is hereby incorporated by reference herein in its entirety.

What is claimed is:

1. An information processing apparatus for determining, for a substrate having undergone an imprint process that forms a pattern of an imprint material on the substrate by using a mold, presence/absence of a formation defect of the pattern, comprising:
   a generating unit configured to generate learning models in one-to-one correspondence with a plurality of different illumination conditions by using images obtained by capturing images of a plurality of substrates on which the pattern is formed under the plurality of illumination conditions, and containing the pattern;
   an obtaining unit configured to input the images obtained by capturing images of the substrates having undergone the imprint process and containing the pattern, to a plurality of learning models generated by the generating unit, and obtain a temporary determination result temporarily indicating the presence/absence of a formation defect of the pattern from each of the plurality of learning models; and
   a determination unit configured to determine the presence/absence of a formation defect of the pattern on the substrate having undergone the imprint process, based on a plurality of temporary determination results obtained by the obtaining unit.

2. The apparatus according to claim 1, wherein the illumination conditions include a wavelength of light for illuminating the plurality of substrates.

3. The apparatus according to claim 2, wherein the image obtained by image capturing under the plurality of illumination conditions and containing the pattern contains information of a film thickness of the pattern.

4. The apparatus according to claim 1, wherein the plurality of illumination conditions include at least an illumination condition for capturing an image of the substrate having undergone the imprint process.

5. The apparatus according to claim 1, wherein
   the generating unit generates learning models in one-to-one correspondence with the plurality of illumination conditions by using an auto encoder, and
   the obtaining unit obtains the temporary determination result from the learning model corresponding to each of the plurality of illumination conditions.

6. The apparatus according to claim 1, wherein the determination unit determines that there is no formation defect of the pattern, if at least one of the plurality of temporary determination results indicates the absence of a formation defect of the pattern.

7. The apparatus according to claim 1, wherein the determination unit determines that there is no formation defect of the pattern, if, among the plurality of temporary determination results, the number of temporary determination results indicating the absence of a formation defect of the pattern is larger than that of temporary determination results indicating the presence of a formation defect of the pattern.

8. The apparatus according to claim 1, wherein the illumination conditions include a light amount of light for illuminating the plurality of substrates.

9. The apparatus according to claim 1, wherein a formation defect of the pattern includes at least one of protrusion of the imprint material to outside a prospective pattern formation region on the substrate, and unfilling of the imprint material in the prospective pattern formation region on the substrate.

10. An imprint apparatus for performing an imprint process of forming a pattern of an imprint material on a substrate by using a mold, comprising an information processing apparatus configured to determine presence/absence of a formation defect of the pattern, for the substrate having undergone the imprint process,
    wherein the information processing apparatus includes the information processing apparatus cited in claim 1.

11. An article manufacturing method comprising:
    forming a pattern on a substrate by using the imprint apparatus cited in claim 10;
    processing the substrate on which the pattern is formed in the forming; and
    manufacturing an article from the processed substrate.

12. A lithography system comprising:
    an imprint apparatus configured to perform an imprint process of forming a pattern of an imprint material on a substrate by using a mold; and
    an information processing apparatus configured to determine presence/absence of a formation defect of the pattern, for the substrate having undergone the imprint process,
    wherein the information processing apparatus includes the information processing apparatus cited in claim 1.

13. An information processing apparatus for determining, for a substrate having undergone an imprint process that forms a pattern of an imprint material on the substrate by using a mold, presence/absence of a formation defect of the pattern, comprising:
    an obtaining unit configured to input images obtained by capturing images of the substrates having undergone the imprint process and containing the pattern, to a plurality of learning models that are generated by using images obtained by capturing, under a plurality of different illumination conditions, images of a plurality of substrates on which the pattern is formed and containing the pattern, and that correspond to the plurality of illumination conditions, and obtain a temporary determination result temporarily indicating the presence/absence of a formation defect of the pattern from each of the plurality of learning models; and
    a determination unit configured to determine the presence/absence of a formation defect of the pattern on the substrate having undergone the imprint process, based on a plurality of temporary determination results obtained by the obtaining unit.

14. The apparatus according to claim 13, wherein a formation defect of the pattern includes at least one of protrusion of the imprint material to outside a prospective pattern formation region on the substrate, and unfilling of the imprint material in the prospective pattern formation region on the substrate.

15. An information processing apparatus for generating, for a substrate having undergone an imprint process that forms a pattern of an imprint material on the substrate by using a mold, a learning model for determining presence/absence of a formation defect of the pattern, comprising a generating unit configured to generate learning models in one-to-one correspondence with a plurality of different illumination conditions, by using images obtained by capturing, under the plurality of illumination conditions, images of a plurality of substrates on which the pattern is formed.

16. The apparatus according to claim 15, wherein a formation defect of the pattern includes at least one of protrusion of the imprint material to outside a prospective pattern formation region on the substrate, and unfilling of the imprint material in the prospective pattern formation region on the substrate.

17. A determination method of determining, for a substrate having undergone an imprint process that forms a pattern of an imprint material on the substrate by using a mold, presence/absence of a formation defect of the pattern, comprising:

generating learning models in one-to-one correspondence with a plurality of different illumination conditions by using images obtained by capturing images of a plurality of substrates on which the pattern is formed under the plurality of illumination conditions, and containing the pattern;

inputting the images obtained by capturing images of the substrates having undergone the imprint process and containing the pattern, to a plurality of learning models generated in the generating, and obtaining a temporary determination result temporarily indicating the presence/absence of a formation defect of the pattern from each of the plurality of learning models; and a third step of determining the presence/absence of a formation defect of the pattern on the substrate having undergone the imprint process, based on a plurality of temporary determination results obtained in the inputting.

18. A non-transitory computer-readable storage medium for storing a program that causes a computer to execute a determination method of determining, for a substrate having undergone an imprint process that forms a pattern of an imprint material on the substrate by using a mold, presence/absence of a formation defect of the pattern, wherein the determination method comprises:

generating learning models in one-to-one correspondence with a plurality of different illumination conditions by using images obtained by capturing images of a plurality of substrates on which the pattern is formed under the plurality of illumination conditions, and containing the pattern;

inputting the images obtained by capturing images of the substrates having undergone the imprint process and containing the pattern, to a plurality of learning models generated in the generating, and obtaining a temporary determination result temporarily indicating the presence/absence of a formation defect of the pattern from each of the plurality of learning models; and determining the presence/absence of a formation defect of the pattern on the substrate having undergone the imprint process, based on a plurality of temporary determination results obtained in the inputting.

* * * * *